ization Search
(12) United States Patent  
Dorgan et al.

(10) Patent No.: US 8,877,338 B2  
(45) Date of Patent: Nov. 4, 2014

(54) SUSTAINABLE POLYMERIC NANOCOMPOSITES

(75) Inventors: John R. Dorgan, Golden, CO (US);  
Laura O. Hollingsworth, Golden, CO (US)

(73) Assignee: Polynew, Inc., Golden, CO (US)

( * ) Notice: Subject to any disclaimer, the term of this patent is extended or adjusted under 35 U.S.C. 154(b) by 559 days.

(21) Appl. No.: 11/943,475

(22) Filed: Nov. 20, 2007

(65) Prior Publication Data  
US 2008/0118765 A1 May 22, 2008

Related U.S. Application Data

(60) Provisional application No. 60/866,889, filed on Nov. 22, 2006.

(51) Int. Cl.  
*B32B 1/02* (2006.01)  
*B32B 9/02* (2006.01)  
(Continued)

(52) U.S. Cl.  
CPC ............... *C08G 63/08* (2013.01); *B82Y 30/00* (2013.01); *C08G 63/823* (2013.01); *C08J 3/005* (2013.01); *C08L 1/02* (2013.01); *C08L 67/04* (2013.01); *B29C 47/0011* (2013.01); *B29C 47/0021* (2013.01); *B29C 47/10* (2013.01); *B29K 2105/0032* (2013.01); *B29K 2105/0044* (2013.01); *C08J 2301/02* (2013.01); *C08L 1/10* (2013.01); *C08L 1/12* (2013.01); *C08L 1/28* (2013.01); *C08L 33/02* (2013.01); *C08L 2205/14* (2013.01); *B29C 47/0004* (2013.01); *B29C 47/1045* (2013.01); *B29K 2105/16* (2013.01)  
USPC ........ 428/357; 428/34.1; 428/34.2; 428/35.7; 428/35.9; 428/36.9

(58) Field of Classification Search  
CPC .................................. B32B 1/02; B32B 9/02  
USPC ............. 428/34.1, 34.2, 35.7, 35.9, 36.9, 357  
See application file for complete search history.

(56) References Cited

U.S. PATENT DOCUMENTS 3,022,287 A * 2/1962 Mench et al. ................... 536/63  
3,109,743 A 11/1963 Fleck  
(Continued)

FOREIGN PATENT DOCUMENTS

EP 2138542 12/2009  
JP 2004359840 A 12/2004  
(Continued)

OTHER PUBLICATIONS

Mohanty, A.K., Misra, M., Drzal, L.T., "Sustainable Bio-Composites from Renewable Resources: Opportunities and Challenges in the Green Materials World", Journal of Polymers and the Environment, 10, No. 1/2: Apr. 19-26, 2002.

(Continued)

*Primary Examiner* — Marc Patterson  
(74) *Attorney, Agent, or Firm* — Sheridan Law, LLC (57) ABSTRACT

The development described provides methods of producing functionalized cellulose in a one-step acid treatment process and of using the cellulose so derived to make composite polymer materials. The composite materials may include mixtures of the acid treated cellulose, functionalized cellulose polymers, including but not limited to cellulose acetate, cellulose butyrate, cellulose propionate, methyl cellulose, and ethyl cellulose, biobased and/or biodegradable polymers, impact modifying agents, and other components such as nucleating agents and pigments. The composite materials formed possess thermomechanical properties that differ from those of similar polymer composites made using prior art. In particular, the composite and nanocomposite materials are characterized by increased heat distortion temperatures and improved impact strengths.

16 Claims, 7 Drawing Sheets

(51) Int. Cl.

| | |
|---|---|
| *C08G 63/08* | (2006.01) |
| *B82Y 30/00* | (2011.01) |
| *C08G 63/82* | (2006.01) |
| *C08J 3/00* | (2006.01) |
| *C08L 1/02* | (2006.01) |
| *C08L 67/04* | (2006.01) |
| *B29C 47/00* | (2006.01) |
| *B29C 47/10* | (2006.01) |
| *B29K 105/00* | (2006.01) |
| *C08L 1/10* | (2006.01) |
| *C08L 1/12* | (2006.01) |
| *C08L 1/28* | (2006.01) |
| *C08L 33/02* | (2006.01) |
| *B29K 105/16* | (2006.01) |

(56) References Cited

U.S. PATENT DOCUMENTS

| | | | | |
|---|---|---|---|---|
| 4,273,795 | A * | 6/1981 | Bosco et al. | 426/602 |
| 4,306,060 | A * | 12/1981 | Ikemoto | 536/69 |
| 4,481,076 | A | 11/1984 | Herrick | |
| 4,697,007 | A | 9/1987 | Seitz et al. | |
| 4,916,193 | A * | 4/1990 | Tang et al. | 525/413 |
| 5,064,950 | A * | 11/1991 | Okuma et al. | 536/57 |
| 5,180,765 | A * | 1/1993 | Sinclair | 524/306 |
| 5,321,064 | A | 6/1994 | Vaidya et al. | |
| 5,405,887 | A * | 4/1995 | Morita et al. | 521/179 |
| 5,486,593 | A * | 1/1996 | Tang et al. | 528/370 |
| 5,540,929 | A | 7/1996 | Narayan et al. | |
| 5,817,728 | A | 10/1998 | Higuchi et al. | |
| 6,103,790 | A | 8/2000 | Cavaille et al. | |
| 6,117,545 | A * | 9/2000 | Cavaille et al. | 428/357 |
| 6,228,213 | B1 * | 5/2001 | Hanna et al. | 162/18 |
| 6,541,627 | B1 | 4/2003 | Ono et al. | |
| 6,703,497 | B1 | 3/2004 | Ladouce et al. | |
| 6,967,027 | B1 | 11/2005 | Heux | |
| 7,005,514 | B2 * | 2/2006 | Nguyen | 536/56 |
| 7,718,718 | B2 | 5/2010 | Kanzawa et al. | |
| 7,863,343 | B2 * | 1/2011 | Haraguchi et al. | 521/60 |
| 2008/0039579 | A1 | 2/2008 | Kimura et al. | |

FOREIGN PATENT DOCUMENTS

| | | |
|---|---|---|
| WO | 2007012142 A1 | 2/2007 |
| WO | 2007105399 A1 | 9/2007 |
| WO | 2008074096 A1 | 6/2008 |

OTHER PUBLICATIONS

Oksman, K., M. Skrifvars, and J.F. Selin, "Natural fibres as reinforcement in polylactic acid (PLA) composites", Composites Science and Technology, 63(9):1317-1324, 2003.

Huda, M.S., et al., "Effect of processing conditions on the physico-mechanical properties of cellulose fiber reinforced poly(lactic acid)", ANTEC 2004 Plastics: Annual Technical Conference, vol. 2: Materials, 2:1614-1618, 2004.

Huda, M.S., et al., "Physico-mechanical properties of "Green" Composites from poly(lactic acid) and cellulose fibers", GPEC, Detroit, USA, 2004.

Serizawa, S., Inoue, K., Iji, M., "Kenaf-Fiber-Reinforced Poly(lactic acid) Used for Electronic Products", Journal of Applied Polymer Science, 100: 618-624, 2006.

Bhardwaj, R., Mohanty, A.K., "Advances in the Properties of Polylactides Based Materials: A Review", Journal of Biobased Materials and Bioenergy, 1: 191-209, 2007.

Ray, S.S., Bousmina, M., "Biodegradable polymers and their layered silicate nanocomposites: In greening the 21st century materials world", Progress in Materials Science 50: 962-1079, 2005.

Samir Masa, Alloin F, Dufresne A., "Review of Recent Research into Cellulosic Whiskers, Their Properties and Their Application in Nanocomposite Field", Biomacromolecules 6: 612-26, 2005.

Petersson, L., Kvien, I., Oksman, K., "Structure and thermal properties of poly(lactic acid)/cellulose whiskers nanocomposite materials", Composites Science and Technology 67 2535-2544, 2007.

Nielsen, L.E., Landel, R.F., Mechanical Properties of Polymers and Composites, Marcel Dekker, New York, 1994: 377-513.

Takemori, M.T., "Towards an understanding of the heat deflection temperature of thermoplastics", Polymer Science and Engineering 19(15), pp. 1104-1109, 1979.

Birgit Braun, John R. Dorgan, and Laura O. Hollingsworth; Supra-Molecular EcoBioNanocomposites Based on Polylactide and Cellulosic Nanowhiskers: Synthesis and Properties; 2009 American Chemical Society journal; Biomacromolecules 2012; pp. 2013-2019; vol. 13; ACS Publications.

Birgit Braun and John R. Dorgan; Single-Step Method for the Isolation and Surface Functionalization of Cellulosic Nanowhiskers; 2009 American Chemical Society journal; Biomacromolecules 2009; pp. 334-341; vol. 10; ACS Publications.

* cited by examiner

SUSTAINABLE POLYMERIC NANOCOMPOSITES

CROSS REFERENCE TO RELATED APPLICATION

This application claims the benefit of priority under 35 U.S.C. §119(e) from U.S. Provisional Patent Application No. 60/866,889, entitled "Biodegradable Nanocomposites having Improved Heat Distortion Temperatures", filed Nov. 22, 2006, which is incorporated herein in its entirety by this reference.

BACKGROUND

An established route to improving the physical properties of a chosen polymer is through the introduction of glass and other fibers, or through other mineral and non-mineral fillers. Generally, improvements may be optimized when good dispersion of the filler and strong interfacial adhesion between the filler and polymer matrix can be achieved. Filling methods may also be cost effective if the filling agents are of moderate cost.

Purely physical mixing of fiber fillers into a polymer have shown some improvements in mechanical properties by the formation of biocomposites. (Mohanty, A. K., Misra, M., Drzal, L. T., *Sustainable Bio-Composites from Renewable Resources: Opportunities and Challenges in the Green Materials World*. Journal of Polymers and the Environment, 10, No. 1/2: 19-26, Apr. 2002). Biobased fibers including kenaf, hemp, jute, sisal, henequen, pineapple leaf, etc. can be incorporated into degradable, biodegradable, and nondegradable polymers. Flax fibers (about 30-40 wt %) have been embedded into a polylactic acid (PLA) matrix by Oksman et al. (Oksman, K., M. Skrifvars, and J. F. Selin, *Natural fibres as reinforcement in polylactic acid (PLA) composites*. Composites Science and Technology, 63(9):1317-1324, 2003) who then compared the resulting composite properties to polypropylene (PP) filled with similar fibers. Promising properties of the flax-PLA composites were found; the composite strength was about 50% greater compared to similar flax-PP composites that are industrially employed. However, a lack of interfacial adhesion between the polymer matrix and the fiber surface was suggested by microscopy studies. Improvement of the tensile strength, tensile modulus and impact strength upon reinforcing PLA with cellulose fibers has been observed (Huda, M. S., et al., *Effect of processing conditions on the physico-mechanical properties of cellulose fiber reinforced poly(lactic acid)*. ANTEC 2004 Plastics: Annual Technical Conference, Volume 2: Materials, 2:1614-1618, 2004; Huda, M. S., et al. *Physico-mechanical properties of "Green" Composites from poly(lactic acid) and cellulose fibers*, at *GPEC*, Detroit, USA, 2004). However, the introduction of cellulose fibers did not affect the glass transition temperature significantly as measured by DSC. Recently it has been demonstrated that kenaf fibers may be mixed with PLA and if the shortest components of the fiber can be removed and a flexible copolymer is also added, then improvements in impact strength and heat distortion temperatures may be obtained (Serizawa, S., Inoue, K., Iji, M., *Kenaf-Fiber-Reinforced Poly(lactic acid) Used for Electronic Products*. Journal of Applied Polymer Science, 100: 618-624, 2006). However, such microcomposites are not transparent and also have various challenges associated with processing into useful parts including usually the need to add an anti-microbial agent.

The limitations associated with microcomposites have led to the development of polymer nanocomposites. In such materials, at least one dimension of the filler material is of a size from about 1 to 100 nanometers. Nanocomposites comprised of polylactide as the matrix have been developed (Bhardwaj, R., Mohanty, A. K., *Advances in the Properties of Polylactides Based Materials: A Review*, Journal of Biobased Materials and Bioenergy, 1: 191-209, 2007). Commonly used nanoscopic fillers (nanofillers) may be clays and other mineral fillers. Clay filled nanocomposites of polylactides have been extensively studied (Ray, S. S., Bousmina, M., *Biodegradable polymers and their layered silicate nanocomposites: In greening the 21$^{st}$ century materials world*, Progress in Materials Science 50: 962-1079, 2005). Filling of plastics with these ammonium ion containing clays renders them generally unsuitable for food packaging due to toxicity and other considerations; decomposition of the ammonium ions leads to the production of ammonia during processing of the plastics into useful items. Additionally, clays are mined materials which are not renewable. Bioplastic nanocomposites may be based on renewable nanofibers in the same manner that a biocomposite is comprised of a biofiber embedded in a bioplastic. This has led a number of researchers to consider the use of cellulosic nanofibers as reinforcing agents for plastics and bioplastics (Samir MASA, Alloin F, Dufresne A. *Review of Recent Research into Cellulosic Whiskers, Their Properties and Their Application in Nanocomposite Field*. Biomacromolecules 6: 612-26, 2005). Recent developments using various forms of microcrystalline and nanoscopic cellulose have considerable prior art associated with them.

U.S. Pat. No. 3,109,743 (Rapid Acetylation of Cellulose Crystallite Aggregates) teaches the preparation of cellulosic microcrystallites (microcrystalline cellulose) by hydrolysis of cellulose using about 2.5N hydrochloric acid for about 15 minutes at boiling temperature or in about 0.5% aqueous hydrochloric acid solution at about 121° C. for about 1 hour. Subsequent mechanical disintegration of aggregates can be accomplished and reaction with acetic anhydride in the presence of small amounts of sulfuric acid as catalyst in the absence of acetic acid provides surface modified microcrystalline cellulose. U.S. Pat. No. 4,481,076 (Redispersible Microfibrillated Cellulose) teaches the fabrication and modification of microfibrillated cellulose through repeated passage through a homogenizer followed by the addition of various additives. A suspension which is redispersable after drying may be formed through the use of additives including polyhydroxy compounds, particularly carbohydrates and carbohydrate related compounds, such as cellulose derivatives, glycols, sugars, alcohols, and carbohydrate derivatives, gums, starches, oligo- and polysaccharides. U.S. Pat. No. 4,697,007 (Preparation of microcrystalline triacetylcellulose) teaches acetylation of microcrystalline cellulose with acetic acid and acetic anhydride using perchloric acid as a catalyst. Here, commercially available microcrystalline cellulose may be suspended in a solvent such as benzene, toluene, xylene or a paraffin hydrocarbon and reacted with acetylating agents (acetic acid and/or acetic anhydride) at temperatures up to about 50° C. in the presence of a catalyst. Separation and purification produces a yield of about 80-85% and the product particle size is between about 5 and about 50 μm. U.S. Pat. No. 6,541,627 (Cellulose Dispersion) teaches the formation of stable dispersion in organic solvents through the use of functional additives including polyhydric alcohol, water-soluble polysaccharides, other water-soluble polymers, and other surface active agents. U.S. Pat. No. 6,703,497 (Cellulose microfibrils with modified surface, preparation method and use thereof) teaches surface modification of prepared suspensions by etherification reactions including silylation reactions, etherification reactions, condensation with isocyanates, condensations or substitutions with alkylene oxides, and condensations or substitutions with glycidyl compounds. U.S. Pat. No. 6,967,027 (Microfibrillated and/or microcrystalline dispersion, in particular of cellulose, in an organic solvent) teaches the formation of table suspensions or dispersions of cellulose microfibrils and/or microcrystals in organic solvents without chemical modification of the cellulose. This is accomplished by forming a mixture comprised of an aqueous suspension of cellulose with a surfactant, co-surfactant, and a stabilizing polymer. Despite the many methods proposed for making, isolating, and surface functionalizing cellulosic fillers there is a continuing need for improved performance at lower cost.

Similarly, the use of microcrystalline, microfibrillar, and nanoscopic cellulosics as a filler in polymer composites is well developed. U.S. Pat. No. 6,103,790 (Cellulose Microfibril-Reinforced Polymers and their Applications) teaches the use of very high aspect ratio nanofibers derived from tunican as polymer reinforcement in a variety of plastic matrices. In this art, the glass transition of the polymer matrix is unaffected. U.S. Pat. No. 6,117,545 (Surface Modified Cellulose Microfibrils, Methods for Making the Same, and Use Thereof as a Filler in Composite Materials) teaches the surface modification of previously isolated cellulose nanowhiskers via esterification reactions of the cellulose nanowhisker surface hydroxyl groups with acetic acid or other organic acids. The use of these surface modified nanowhiskers in composite materials is also taught. Recently, it has been demonstrated that cellulose nanowhiskers derived using sulfuric acid and obtained through a multistep process that had been treated with tert-butanol or a surfactant could be well dispersed in a polylactide matrix to create a composite material with superior physical properties (Petersson, L., Kvien, I., Oksman, K., *Structure and thermal properties of poly(lactic acid)/cellulose whiskers nanocomposite materials*: Composites Science and Technology 67 2535-2544, 2007). Accordingly, while it is known that well-dispersed cellulose nanofillers in polylactide may improve thermal properties, efficient and easily practicable methods for the formation of such composites are lacking.

Thus, there is a desire for improved polymer composites with an improved method of making these filled polymers to achieve the desired polymer physical characteristics rapidly and at an acceptable cost.

SUMMARY

Methods of making polymer composites are disclosed. These methods may produce polymer composites in an economically efficient and environmentally friendly manner. The resulting polymer composites made through these methods may have desirable physical properties.

The methods include creating functionalized microcrystalline cellulose in a one-step process through the use of a mixed acid system comprised of an organic acid, which may be an acetic acid, and hydrochloric acid; of washing and drying the cellulose; and redispersing it in molten lactide monomer or a lactide solution, and of polymerizing the resulting dispersion through the use of stannous octoate or other catalyst. Alternatively, the treated and dried cellulose may be dispersed by mixing with molten polylactides or a polylactide solution to form composites. These composites may consist of cellulosic particles of variable sizes from a few nanometers to hundred of microns in their minimum dimension. Composites may further consist of mixtures of solid cellulose with polylactides and functionalized polymers of cellulose including, but not limited to, cellulose acetate, cellulose butyrate, cellulose propionate, methyl cellulose, and ethyl cellulose. Furthermore, the composites may be formulated to include impact modifying agents including, but not limited to, Dupont Biomax Strong 120 ethylene copolymer, BASF Ecoflex degradable copolymer, and Rhom and Haas Paraloid BPM 500, In an additional embodiment) nucleating agents that assist polymer crystallization may be added to the composite. Another embodiment may include the use of flow additives or modifier including but not limited to polyethylene glycol esters.

DETAILED DESCRIPTION

Several factors may influence the physical properties of polymer composites. Two such factors are the level of both distributive and dispersive mixing as well as the interfacial adhesion between polymer and the filling agent (Nielsen, L. E., Landel, R. F., *Mechanical Properties of Polymers and Composites*, Marcel Dekker, New York, 1994). Briefly, the quality of polymer composites may be affected by 1) the modulus and other thermophysical properties of the fillers and polymers employed, 2) the size and shape of the filler particles (for fibers, aspect ratio is a consideration), 3) the total amount of filler used (measured for example, as filler volume fraction), 4) orientation of the embedded filler particles, 5) intimacy of mixing (distribution of the filler and dispersion of filler aggregates) of filler throughout the polymeric matrix, and 5) the interfacial adhesion between the filler particle surface and the surrounding matrix.

Technologies have been developed to provide composites in which the properties of interfacial adhesion and intimacy of mixing are optimized. When a hydrophilic particle is mixed with a hydrophobic polymer, a lack of dispersion and interfacial adhesion may be observed. These effects are often overcome through the use of a surface modifying agent. For example, in glass and mineral fillers the use of silane coupling agents is practiced and these coupling agents are available with a wide range of chemical functionalities that enable compatibilization with many different plastic materials. However, such coupling agents are based on nonrenewable resources, can be noxious or toxic, and are relatively expensive and therefore precluded in applications like low cost food packaging. Additionally, when it is desired that the polymer composite be degradable, or biodegradable, or based on renewable resources existing technologies tend to be lacking. Thus it may be advantageous to fabricate effective fillers that are based on renewable resources, which are biodegradable, and which have effective surface functionalization which enables their compatibilization with plastics, especially with biodegradable plastics also based on renewable resources.

Methods are disclosed herein for fabricating such fillers when the filling agent is cellulose. In one embodiment, the polymer employed may be polylactide or other renewable, degradable, or biodegradable polymer. The methods described herein produce composites whose physical characteristics differ from those formed by conventional means.

Cellulose derived from plant and other sources possesses a structure that may be described as hierarchical. Crystalline regions of extended cellulose polymer chains exist in so-called microfibrils, which are further assembled into cell walls, films, and fibers. In known routes to so-called microcrystalline cellulose, acid hydrolysis (typically in sulfuric or hydrochloric acid) may be followed by intensive shearing in some type of homogenizer. The resulting aqueous dispersions tend to be mixtures of cellulosic particles ranging from the individualized microfibrils (also called cellulose nanowhiskers) to agglomerates of microfibrils, to micron sized particles. Upon separation and drying, dispersion of any size fraction of the hydrophilic cellulose in a hydrophobic polymer may be difficult to achieve.

The methods proposed herein include creating functionalized microcrystalline cellulose in a one-step process through the use of a mixed acid system comprised of acetic and hydrochloric acid, of washing and drying the cellulose and redispersing it in molten lactide monomer, and of polymerizing the resulting dispersion through the use of stannous octoate or other catalyst. Alternatively, the treated and dried cellulose may be dispersed by mixing with molten polylactides or polylactide solutions to form composites. The composite may also be prepared by treating cellulose using an acid mixture comprised of hydrochloric acid and an organic acid and then washing and drying, adding the resulting cellulose to one or more of molten lactide, lactide solution, molten polylactide and a polylactide solution, and subjecting the mixture to intensive mixing. The resulting mixture may be heated and polymerized, in the presence of stannous octoate or other catalyst. These composites may consist of cellulosic particles of variable sizes from a few nanometers to hundreds of microns in their minimum dimension. Composites may further consist of mixtures of solid cellulose with polylactides and functionalized polymers of cellulose including, but not limited to, cellulose acetate, cellulose butyrate, cellulose propionate, methyl cellulose, and ethyl cellulose. Furthermore, the composites can be formulated to include impact modifying agents including, but not limited to, Dupont Biomax Strong 120 ethylene copolymer, BASF Ecoflex degradable copolymer, and Rhom and Haas Paraloid BPM 500.

In one embodiment, a method for preparing the cellulosic filler is accomplished by soaking cotton linter overnight in either about 90 wt % acetic acid (AcOH) or in deionized (DI) water near room temperature. The resulting suspension is then heated in an oil bath to about 105° C. whereupon hydrochloric acid (HCl) is added to give a final acid concentration of about 2.5 M. Reaction is allowed to proceed for a defined time period, after which the suspension is quenched and centrifuged to remove the acid. This treated cellulose may be repeatedly washed and centrifuged or processed in a continuous centrifuge operation unit operation with the addition of wash water. Afterwards the treated cellulose may be resuspended in water and subjected to intensive mixing in a Waring blender or other high intensity mixer and diluted with DI water. The nanosized fraction of the treated cellulose may be isolated by repeated washing and centrifugation by replacing the initially clear supernatant with DI water until the supernatant remains turbid. Repeated cycles of recovering the supernatant resuspension with intensive mixing, and centrifugation provides batches of a turbid supernatant suspension. The treated cellulose recovered both in the supernatant and as the centrifugation cake may be dried in a number of ways including but not limited to freeze drying, drying in a fluidized bed, or spray drying.

In another embodiment, preformed microcrystalline cellulose such as Avicell may be soaked overnight in either about 90 wt % acetic acid (AcOH) or in deionized (DI) water near room temperature. The resulting suspension may then be heated in an oil bath to about 105° C. whereupon hydrochloric acid (HCl) is added to give a final acid concentration of about 2.5 M. Reaction is allowed to proceed for a defined time period, after which the suspension is quenched and centrifuged to remove the acid. This treated cellulose may be repeatedly washed and centrifuged or processed in a continuous centrifuge operation unit operation with the addition of wash water. Afterwards the treated cellulose may be resuspended in water and subjected to intensive mixing in a Waring blender and diluted with DI water. The nanosized fraction of the treated cellulose may be isolated by repeated washing and centrifugation by replacing the initially clear supernatant with DI water until the supernatant remains turbid.

Figure 1:
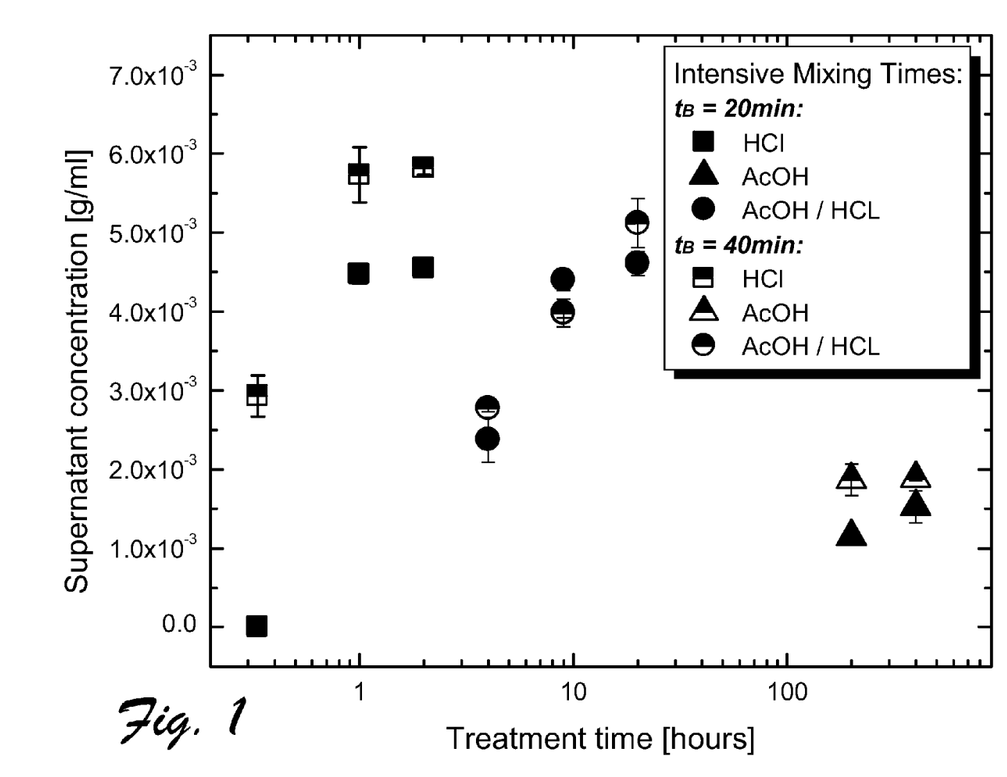
FIG. 1 is a graph of the supernatant concentration of cellulose nanowhiskers found in the supernatant after centrifugation as a function of reaction and mechanical mixing times using hydrochloric acid (HCl), acetic acid (AcOH), and an HCl/AcOH mixture. Data for two different blending times $t_B$ of about 20 and about 40 minutes are shown for each acid system.

FIG. 1 is a graph of the concentration of cellulose in the first turbid supernatant recovered as a function of reaction and mechanical mixing times using hydrochloric acid (HCl), acetic acid (AcOH), and an HCl/AcOH mixture to treat conventional microcrystalline cellulose (i.e. Avicell). Data for two different time periods of intensive mixing, $t_B$, of about 20 and about 40 minutes are shown for each acid system. Repeated cycles of recovering the supernatant, resuspension with intensive mixing, and centrifugation provides additional batches of a turbid supernatant suspension. The treated cellulose recovered both in the supernatant and as the centrifugation cake may be dried in a number of ways including but not limited to freeze drying, drying in a fluidized bed, or spray drying.

Figure 2:
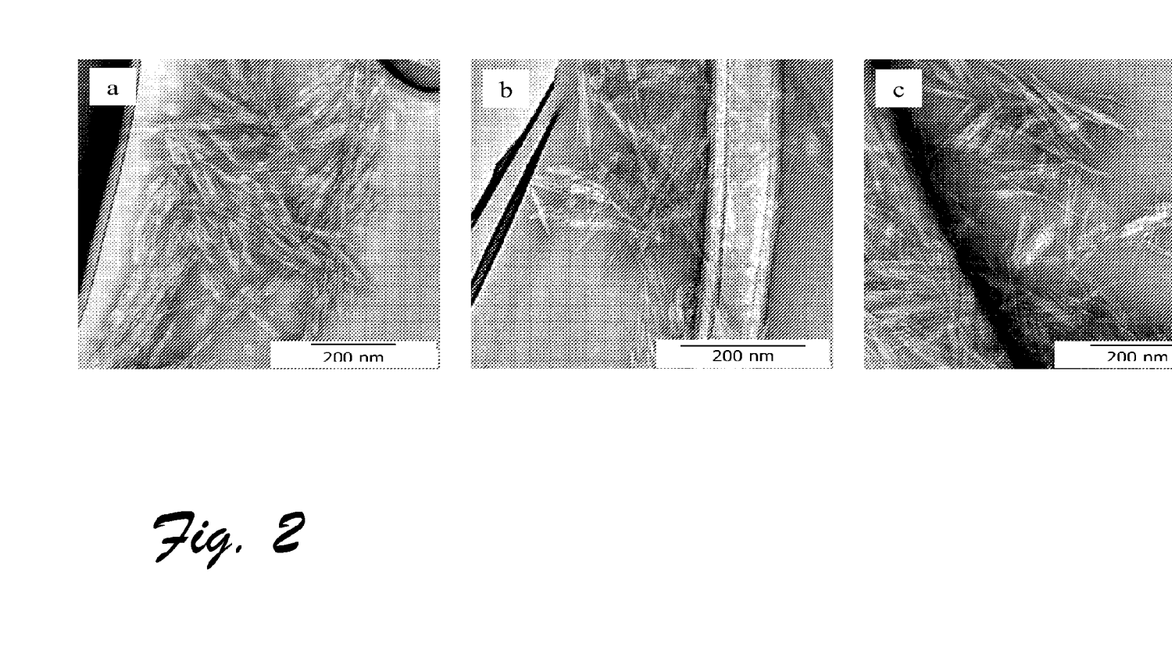
FIG. 2 are transmission electron micrograph (TEM) images of cellulose nanowhiskers isolated in the supernatant after centrifugation from: a) hydrochloric acid treatment for about 60 min followed by about 40 min intensive mixing, b) acetic acid treatment for about 200 hrs and about 40 minutes of intensive mixing, c) mixed acetic/hydrochloric acid treatment for about 9 hrs and about 40 min intensive mixing. All three acid systems may produce cellulosic nanowhiskers.

FIG. 2 shows transmission electron micrograph (TEM) images of cellulose nanowhiskers isolated in the supernatant after centrifugation from: a) hydrochloric acid treatment for about 60 min followed by about 40 min intensive mixing, b) acetic acid treatment for about 200 hrs and about 40 minutes of intensive mixing, c) mixed acetic/hydrochloric acid treatment for about 9 hrs and about 40 min intensive mixing. FIG. 2 demonstrates that the morphology of the cellulose nanowhiskers isolated may not be affected by the type of mixed acid system used.

Figure 3:
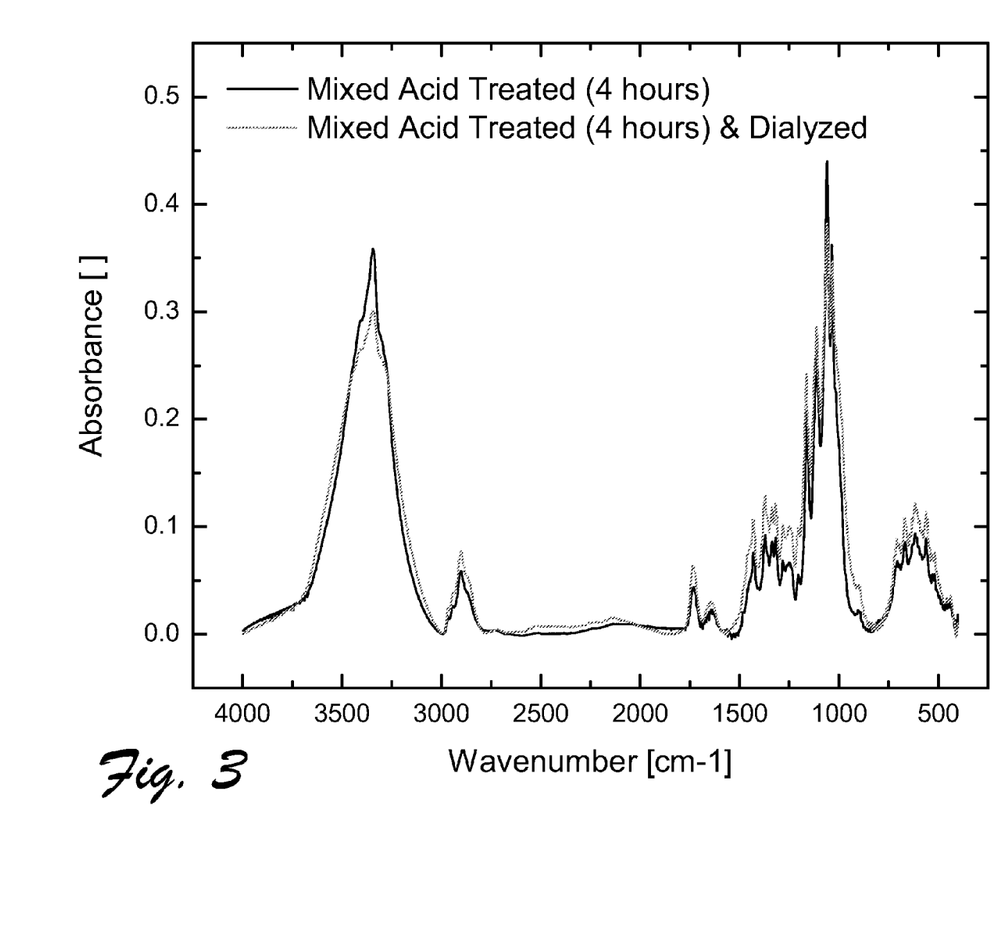
FIG. 3 shows Fourier Transform Eared (FTIR) spectra obtained from dried cellulose obtained after about 4 hours of mixed acid treatment; data for dialyzed and non-dialyzed samples are shown.

FIG. 3 shows Fourier Transform Infrared (FTIR) spectra obtained from cellulose isolated by centrifugation after a mixed acid treatment of about 4 hours. The spectral peak centered at 1736 cm$^{-1}$ corresponds to the stretch of the carbonyl carbon of the acetyl group and is absent in cellulose treated only with hydrochloric acid (not shown). To experimentally verify the formation of covalently bonded acetate groups in the case of the mixed acid treatment, suspensions obtained from the mixed treatment of hydrochloric and acetic acid were dialyzed against deionized water until the pH of the buffer solution remained unchanged, and were then freeze-dried. The FTIR spectra recorded for dialyzed samples so derived are shown included in FIG. 3. The strong similarity of the dialyzed samples and non-dialyzed samples demonstrates covalent attachment of acetate groups to the celluloses. For both dialyzed and non-dialyzed samples, the peak at 1736 cm$^{-1}$ is present indicating that the acetyl groups are indeed covalently bonded to the surface.

The cellulose used in the above preparations may come from a wide variety of sources including but not limited to cotton, tunican, ash, poplar, fiber, wood flour, straws, bagasse, coconut hull/fiber, cork, corn cob, corn stover, gilsonite, nutshell, nutshell-flour, rice hull, sisal, hemp or soybean. Alternatively, the filler may be starch-based microspheres, carbon black, glass, glass fibers, carbon fibers, metallic particles, magnetic particles, montmorillonite, buckminsterfullerene, carbon nanotubes, carbon nanoparticles, silicas, cellulosic nanofibers, synthetic silicates or synthetically prepared nanoparticles. The filler may be cellulose derived from cotton.

In one embodiment, a method of mixing treated cellulose with lactide to form a premix and then contacting this premix with a polymerization catalyst at temperatures in the range of about 90° C. to about 280° C., possibly in the range of about 120° C. to about 250° C., and possibly in the range of about 165° C. to about 195° C. to produce a composite polymer and then contacting the composite polymer with poly(acrylic acid) to form a stabilized composite material is provided. In another embodiment, the polymerization catalyst may be stannous octoate, triphenylphosphine, trisnonylphenylphosphate, and/or mixtures thereof. Unreacted lactide monomer may be removed by devolatilization or by other means. Additionally, deactivation of the catalyst at the end of a specified reaction time may be used to ensure a controlled termination of the reaction and to provide stability against molecular weight changes during any subsequent processing steps. This method is referred to as reactive compatibilization.

In another embodiment, a method of mixing the treated cellulose with molten polylactide in the temperature range of about 150° C. to about 200° C., possibly in the range of about 160° C. to about 180° C., to produce a composite material may be provided. This method is referred to as melt mixing.

In another embodiment, a method of mixing the treated cellulose with preformed polylactide through the use of a solvent, including but not limited to chloroform, at ambient or elevated temperatures may be provided, This method is referred to as solution blending.

Figure 4:
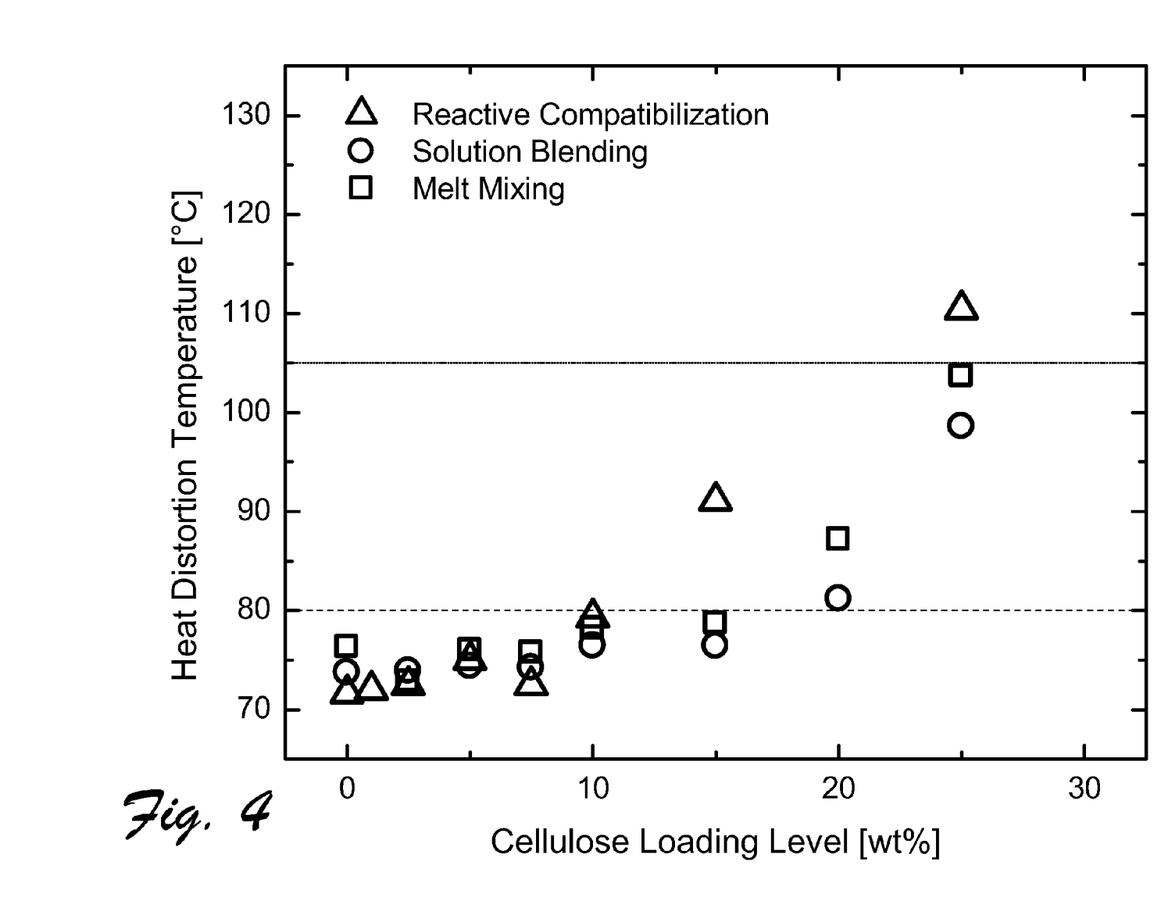
FIG. 4 is a graph of the heat distortions temperature (HDT) versus cellulose weight loading for polylactide cellulose composites made by the three embodiments of the present invention, namely reactive compatibilization, melt mixing, and solution blending.

FIG. 4 is a plot of the Heat Distortion Temperature (HDT) for polylactide-cellulose composites prepared using non-size separated treated cellulose by the different methods disclosed herein. The data at higher loading levels illustrates that the reactive compatibilization methodology may exhibit the highest HDT for a given loading level.

Other embodiments include composite polymers made by the addition of functionalized polymers of cellulose including but not limited to, cellulose acetate, cellulose butyrate, cellulose propionate, methyl cellulose, and ethyl cellulose. In this embodiment, the composite may also contain a transesterification catalyst to promote interchange reactions between various components present in the composite. Possible catalysts of the interchange reactions include titanium(IV) isopropoxide (TIP), and may also include dibutyl tin oxide (DBTO), mono-, di-, and tetraalkyl tin(IV) compounds, monobutyltin trichloride (BuSnCl$_3$), TBD (1,5,7-triazabiscyclo(4.4.0)dec-5-ene), acid catalysts like sulfonic and sulfuric acids, base catalysts like sodium methylate, sodium methoxide, potassium methoxide, sodium hydroxide and potassium hydroxide, organic bases like triethylamine, piperidine, 1,2,2,6,6-pentamethylpiperidine, pyridine, 2,6-di-tert-butylpyridine, 1,3-disubstituted tetrakis(fluoroalkyl)distannoxanes, 4-dimethyl-aminopyridine (DMAP) and guanidine, alkaline metal alkoxides and hydroxides, basic zeolites and related solid compounds such as cesium-exchanged NaX faujasites, mixed magnesium-aluminum oxides, magnesium oxide and barium hydroxide, 4-(dimethylamino)pyridine (DMAP), 4-pyrrolidinopyridine (PPY), salts of amino acids, and enzyme transesterification catalysts.

Figure 5:
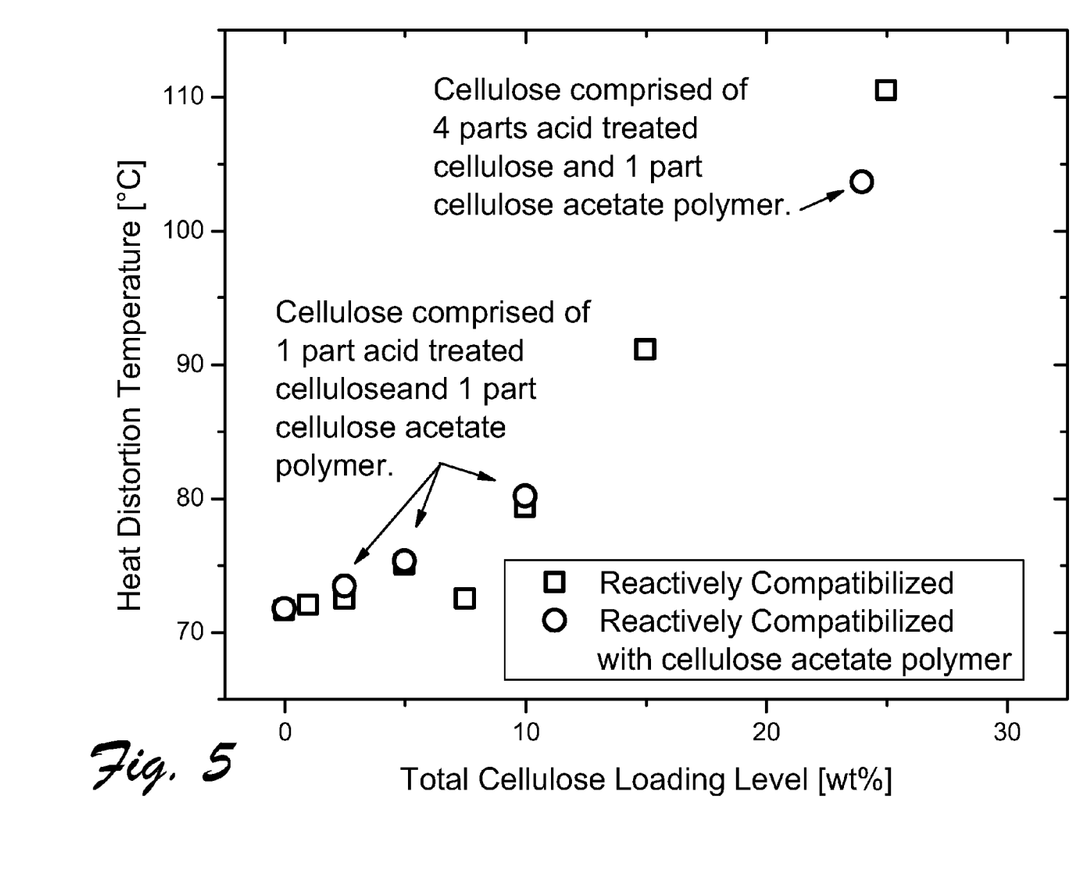
FIG. 5 is a graph showing the heat distortions temperature (HDT) versus total cellulose content for reactively compatibilized polylactide-cellulose composites containing mixtures of acid treated cellulose and cellulose acetate polymers. In the samples containing cellulose acetate, total loadings of about 2.5 wt % about 5 wt %, and about 10 wt % contain about equal weights of acid treated cellulose and cellulose acetate polymer. The sample having about 24 wt % cellulose contains approximately 19 wt % acid treated cellulose and about 5 wt % cellulose acetate.

FIG. 5 is a plot of the HDT for reactively compatibilized samples in which the total cellulose weight loading may be comprised of a mixture of acid treated cellulose and cellulose acetate polymer. Data is presented for samples comprised only of acid treated cellulose (squares) and for samples comprised of mixtures of acid treated cellulose and cellulose acetate polymer (circles). For the cellulose and cellulose acetate samples having total weight loadings of about 2.5 wt %, about 5 wt %, and about 10 wt % the cellulose is comprised of about 1 part acid treated cellulose and about 1 part cellulose acetate polymer. For the cellulose and cellulose acetate sample having a total weight loadings of about 24 wt %, the total cellulose is comprised of about 4 parts acid treated cellulose and about 1 part cellulose acetate polymer. Accordingly, various mixtures of acid treated cellulose and cellulose acetate polymer may be combined to increase the heat distortion temperature of polylactide-cellulose composite materials.

Figure 6:
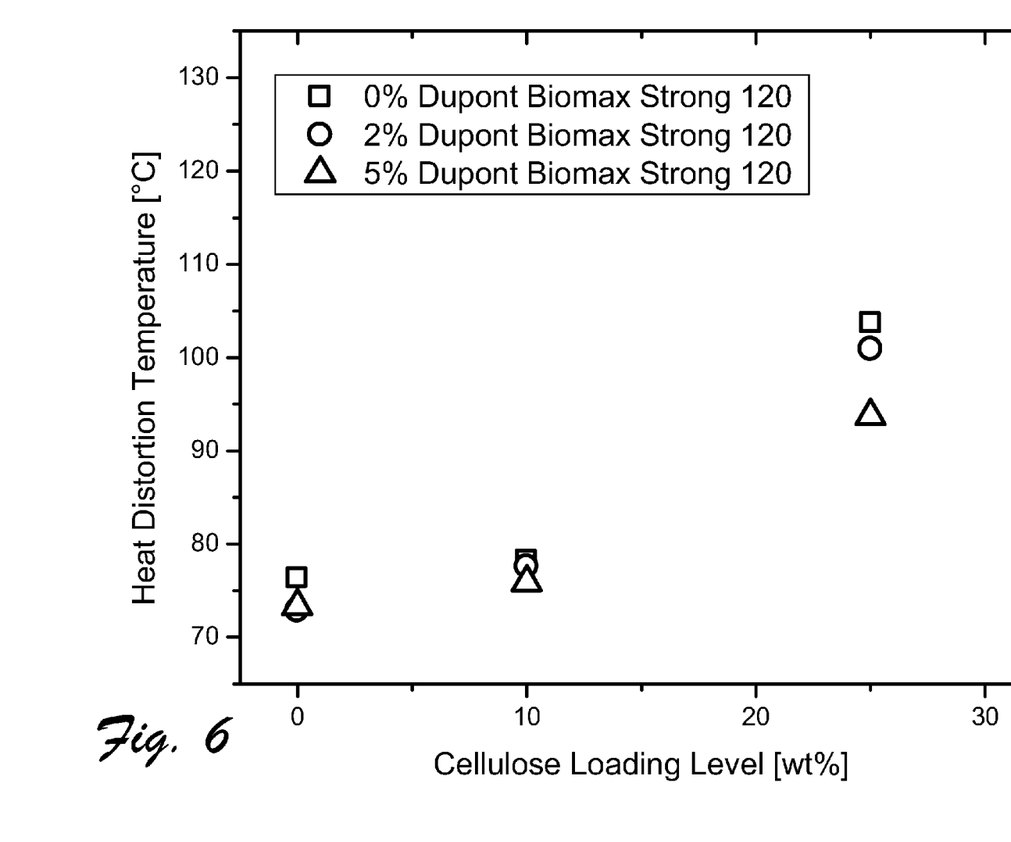
FIG. 6 is a graph of heat distortion temperature (HDT) for polylactide composites versus cellulose loading level in which only acid treated cellulose is used but to which an ethylene copolymer impact modifying agent (in this case, Dupont Biomax Strong 120) has been added.

Other embodiments may include composite polymers made by the addition of impact modifying agents including but not limited to Dupont Biomax Strong 120 ethylene copolymer, Dupont Biomax Strong 100 ethylene copolymer, Arkema Biostrength 130 acrylic polymer, Arkema Biostrength 150 methacrylate-butadiene-styrene copolymer, Chemtura Blendex 338 acrylonitrile-butadiene-styrene copolymer, BASF Ecoflex degradable polyester copolymer, and Rhom and Haas Paraloid BPM 500 functionalized polymer. In FIG. 6, the heat distortion temperature is plotted versus cellulose loading level in which only acid-treated cellulose is used but to which an ethylene copolymer impact modifying agent (Dupont Biomax Strong 120) has been added and the composites are formed by the melt mixing method. FIG. 6 illustrates that increases in heat distortion temperature may be obtained with simultaneous addition of an impact modifying agent. Alternatively, the impact modifier may be a mineral filler like Specialty Minerals EM Force Bio.

Other embodiments include composite polymers made by the addition of various nucleating agents including but not limited to magnesium silicate, calcium carbonate, or calcium sulfate.

In another embodiment, flow modifiers may be polyethylene glycol esters (mono- or di-esters of a fatty acid or oil reacted with a polyethylene glycol). PEG-150 such as BASF MAPEG 6000 DS derived from renewable resources may be used in an amount between about 0.1 and about 5.0 wt %. These flow agents may be combined with impact modifying agents including but not limited to BASF Ecoflex degradable polyester copolymer, Dupont Biomax Strong 120 ethylene copolymer, Dupont Biomax Strong 100 ethylene copolymer, Arkema Biostrength 130 acrylic polymer, Arkema Biostrength 150 methacrylate-butadiene-styrene copolymer, Chemtura Blendex 338 acrylonitrile-butadiene-styrene copolymer, and Rhom and Haas Paraloid BPM 500 functionalized polymer.

Figure 7:
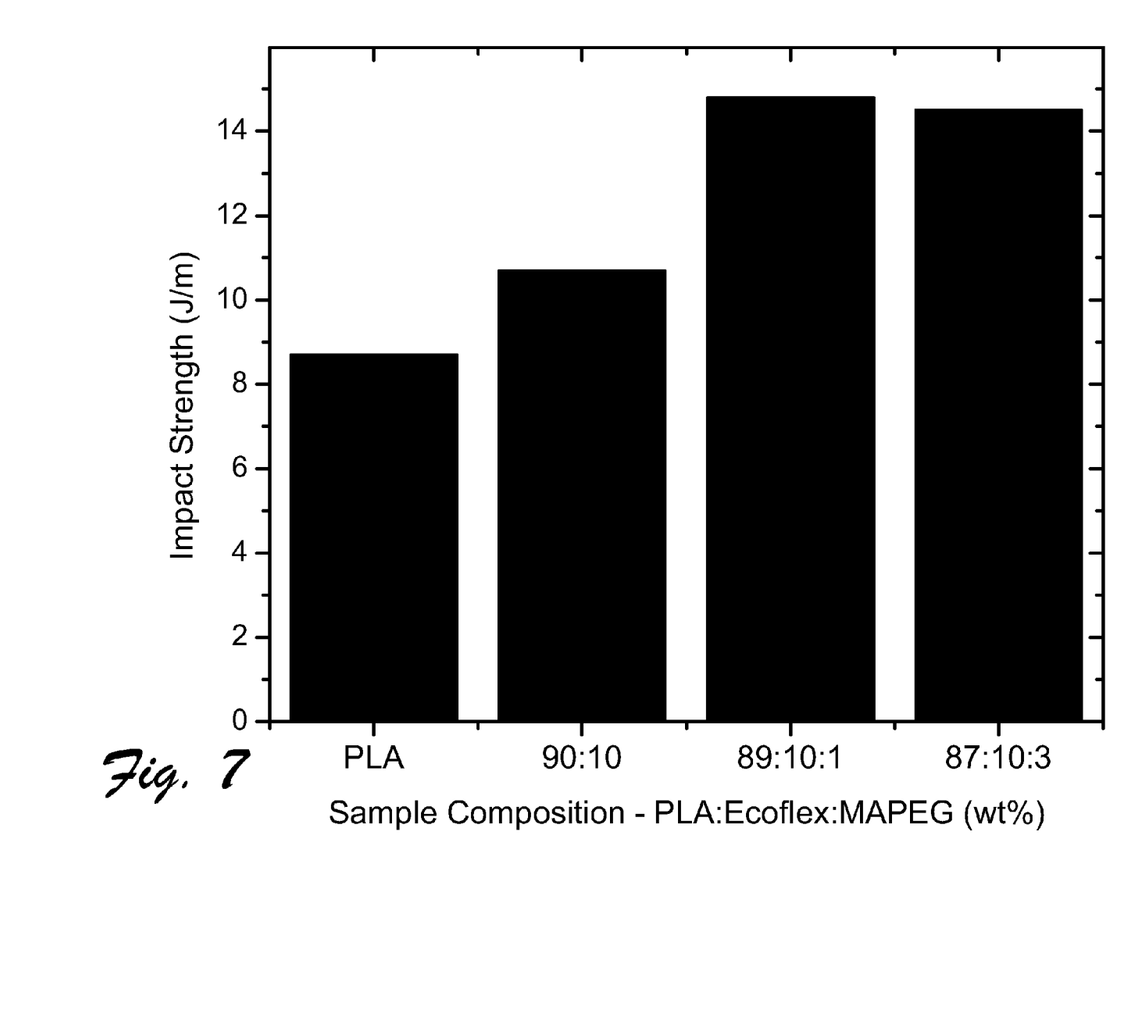
FIG. 7 presents the values for the impact strength of polylactide combined with BASF Ecoflex copolymer and BASF MAPEG 6000 DS polyethylene glycol esters.

FIG. 7 presents the values for the impact strength of polylactide combined with BASF Ecoflex copolymer and BASF MAPEG 6000 DS polyethylene glycol esters. Impact modifying polymers in an amount of about 0.5 wt % to 20 wt % may be combined with polyethylene glycol esters in the amount of about 0.1% to 10%, other ranges may include about 2 wt % to about 15 wt % of impact-modifying polymers, and polyethylene glycol esters in the amount of about 0.5 wt % to about 3.5 wt %. The impact modifier may be a mineral filler like Specialty Minerals EM Force Bio.

Mixing of the reagents during polymerization, melt mixing, or solution blending may be effected by controlled mechanical means such as a commercial reactor, mixing device, or extruder; the extruder may have a static mixer attached.

After the polymerization reactions and/or mixing of components have been terminated, the composite polymers formed by the methods of the present invention may be processed into a commercially desirable form such as pellets through procedures such as cutting, grinding, or underwater pelletizing.

Additional objects, advantages, and novel features of this invention will become apparent to those skilled in the art upon examination of the following examples. Those of ordinary skill in the art will readily understand that these examples are not limiting on the invention as defined in the claims which follow.

EXAMPLES

L-lactide and polylactide (PLA) were purchased from Cargill Dow Polymers, now NatureWorks, (Minnetonka, Minn.) and used without further purification. Lactide was dried under vacuum (about 22 inch Hg) at about 50° C. for at least about 8 hours prior to use. PLA was dried under vacuum (about 25 inch Hg) at about 110° C. for at least about 12 hours before being used. Alternatively, drying by conventional methods using desiccated air or other gas passed over the materials to be dried may be practiced.

Cotton linter samples of about 1 cm$^3$ were soaked overnight in either about 90 wt % acetic acid (AcOH) or in deionized (DI) water at ambient temperature. The resulting suspension was subsequently heated to about 105° C., and HCl was added to give a final acid concentration of about 2.5 M. The final solid to liquid ratio was about 0.05 g/ml in all experiments. Treatment in the acid system was performed for a specified time after which the suspension was quenched in an ice bath followed by centrifugation at about 8,600 g for about 3 minutes to remove the acid (washing in DI water and centrifugation was repeated for about 3 total cycles). The suspensions were then concentrated to about 10 wt % and mechanically agitated in a Waring laboratory blender for either about 20 or about 40 minutes. Afterwards they were diluted with an equal volume of DI water. CNW were isolated by repeated washing (centrifugation at about 8,600 g for about 3 min) by replacing the initially clear supernatant with DI water until the supernatant remained turbid. After collection of the first turbid supernatant, the cake was re-suspended and again centrifuged to obtain additional CNW in the form of a turbid supernatant suspension. The first three turbid supernatants were recovered, combined and analyzed. Supernatant suspensions were dialyzed against DI water with daily buffer changes until the pH of the buffer solution remained constant for use as a control against the supernatants simply washed towards neutral pH. The centrifugation cake is similarly recovered, resuspended in water as a means of washing towards neutrality, and centrifuged and dried for subsequent use in composite materials.

Avicell microcrystalline cellulose obtained from Fluka chemicals was soaked overnight in either about 90 wt % acetic acid (AcOH) or in deionized (DI) water at ambient temperature. The resulting suspension was subsequently heated to about 105° C., and HCl was added to give a final acid concentration of about 2.5 M. The final solid to liquid ratio was about 0.05 g/ml in all experiments. Treatment in the acid system was performed for a specified time after which the suspension was quenched in an ice bath followed by centrifugation at about 8,600 g for about 3 minutes to remove the acid (washing in DI water and centrifugation was repeated for about 3 total cycles). The suspensions were then concentrated to about 10 wt % and mechanically agitated in a Waring laboratory blender for either about 20 or about 40 minutes. Afterwards they were diluted with an equal volume of DI water. CNW were isolated by repeated washing (centrifugation at about 8,600 g for about 3 min) by replacing the initially clear supernatant with DI water until the supernatant remained turbid. After collection of the first turbid supernatant, the cake was re-suspended and again centrifuged to obtain additional CNW in the form of a turbid supernatant suspension. The first three turbid supernatants were recovered, combined and analyzed. Supernatant suspensions were dialyzed against DI water with daily buffer changes until the pH of the buffer solution remained constant for use as a control against the supernatants simply washed towards neutral pH. The centrifugation cake is similarly recovered, resuspended in water as a means of washing towards neutrality, and centrifuged and dried for subsequent use in composite materials.

Premixtures of acid treated cellulose and lactide were made using a Waring laboratory blender fitted with a heating mantle, thermocouple, and temperature controller. Dried lactide was introduced into the blended and heating to above the melting point of the lactide used, temperatures of about 30° C. to about 230° C. are used, alternately, temperatures of about 95° C. to 110° C. are used. Once the lactide is melted, the blender is started and the acid treated cellulose is introduced. The resulting cellulose in molten lactide mixture is subjected to intensive mixing by blending for about 20 minutes to provide a dispersion of acid treated cellulose in lactide. This premixture may be used directly for polymerization by pouring the liquid mixture into a reaction vessel and initiating polymerization. Alternatively, after blending, the premixture may be allowed to cool and solidify. The solid premixture may be dried as is or pulverized into a powder and dried. In cases where the final composite contains functionalized cellulosic polymers, including but not limited to cellulose acetate, cellulose butyrate, cellulose propionate, methyl cellulose, and ethyl cellulose, these polymers may be added in powder form to the solidified premix to form a modified premixtures. These solid premixtures may be stored and used when needed.

Polylactide may be polymerized from lactide monomer; various catalysts may be employed in the polymerization reaction. One catalyst that is FDA-approved for food contact is the tin compound stannous octoate. Stannous octoate used in the present disclosure was obtained from Sigma Aldrich and either used as received or distilled under vacuum prior to use. The molar ratio, R, of lactide to stannous octoate was about R=2500. The co-catalyst triphenylphosphine may have a beneficial effect on the polymerization kinetics of L-lactide in reactions with $Sn(Oct)_2$ as catalyst. Triphenylphospine was purchased from Sigma Aldrich and used without further purification or distilled prior to use. When employed, triphenylphosphine was added in an about equimolar amount to stannous octoate. For handling purposes, solutions of the catalyst and co-catalyst as well as stabilizing agents and any transesterification agent employed may be prepared in a dry solvent such as distilled toluene or dioxane.

Reactively compatibilized composites were prepared from premixtures of acid-treated cellulose cake and lactide through simultaneous polymerization and mixing in a Haake Rheomix 3000. Alternatively, modified premixtures containing functionalized polymers of cellulose including but not limited to cellulose acetate, cellulose butyrate, cellulose propionate, methyl cellulose, and ethyl cellulose were used. Polymerizations were performed at about 180° C. for about 30 minutes at about 25 rpm. Premixtures of acid treated cellulose and lactide were introduced into the reactor and heated to provide a molten mixture. Once a temperature of about 180° C. was reached, solution containing the catalyst and co-catalyst was added to initiate the polymerization reaction. At the end of the reaction time, the polyacrylic acid (PAA) solution was added and mixed with the material for about a minute prior to extraction from the mixer. The catalyst was deactivated using poly(acrylic acid), PAA of a molecular weight of about 2000 g/mol, (at a level of about 0.25 wt % of lactide) purchased from Sigma Aldrich and dissolved in dioxane for transfer purposes. Addition of impact modifying agents comprised of DuPont Biomax Strong, BASF Ecoflex copolymer, and BASF MAPEG 6000 DS polyethylene glycol ester in amounts of about 2 wt % to about 20 wt % was subsequently made and mixing was continued for between about 5 and about 10 minutes. Alternatively, said reactively compatibilized composites can be prepared in the presence of a solvent including but not limited to toluene.

Acid-treated cellulose was dried at about 60° C. under vacuum (about 25 in Hg) for about 24 hrs. After purging with argon, the material was suspended in anhydrous toluene (from Sigma Aldrich, about <0.001% water) and sonicated for about 24 hours. L-lactide was recrystallized from ethyl acetate and dried at about 40° C. under vacuum (about 25 in Hg) for about 48 hrs. Monomer, added to obtain a concentration of about 0.28 g/ml, was weighed out into a flame-dried, argon-purged round bottom flask and dried again at about 40° C. under vacuum (about 25 in Hg) for about 48 hrs. The sonicated cellulose suspension was transferred into the round-bottom flask and the mixture purged with argon for about 5 minutes. Stannous octoate catalyst was added at a ratio of about R=2500 monomer molecules per catalyst molecule, and the round-bottom flask was heated to about 90° C. The reaction was allowed to proceed at near-constant temperature for about 68 hours. The suspension was diluted with chloroform, and poly(acrylic acid), PAA with a molecular weight of about 2000 g/mol purchased from Sigma Aldrich, dissolved in dioxane added at a level of about 0.25 wt % of lactide to deactivate the catalyst. After stirring for about 24 hrs, the polymer composite was precipitated into about a ten-fold excess of methanol and dried under vacuum at about 60° C. overnight.

Size-separated, acid-treated cellulose supernatant was dried at about 60° C. under vacuum (about 25 in Hg) for about 24 hrs. L-lactide was recrystallized from ethyl acetate and dried, then weighed out into a flame-dried round-bottom flask and dried again at about 40° C. under vacuum (about 25 in Hg) for about 24 hours. Dried acid-treated cellulose was transferred into the round-bottom flask containing lactide and the mixture purged with argon for about 10 minutes. The mixture was heated and stirred at about 130° C. for a short period of time, between about 0 minutes and about 30 minutes, before catalyst addition. The catalyst was added at a ratio of about R=2500 monomer molecules per catalyst molecule. The reaction was allowed to proceed for about 4 hours. The resulting nanocomposite material was dissolved in chloroform, and poly(acrylic acid), PAA with a molecular weight of about 2000 g/mol purchased from Sigma Aldrich, dissolved in dioxane was added at a level of about 0.25 wt % of initially present lactide to deactivate the catalyst. After stirring for about 24 hours, the polymer composite was precipitated into an about ten-fold excess of methanol and dried under vacuum (about 25 in Hg) at about 60° C. overnight.

Melt mixed composite materials were formed by adding NatureWorks polylactide to a Haake Rheomix 3000 and heating while mixing to a temperature above about 150° C., possibly at about 165° C., to form a molten or nearly molten polymer liquid. To this molten polymer, acid treated cellulose is added to control the final weight loading in the composite material. The resulting mixture is heated with mixing to a temperature of about 180° C. and stabilizing agents, including but not limited to trisnonylphenylphosphate, are added. The mixture is subjected to intensive mixing in the heated state for about 30 minutes. Addition of impact modifying agents comprised of DuPont Biomax Strong 120, BASF Ecoflex copolymer, and BASF MAPEG 6000 DS polyethylene glycol ester in amounts of about 2 wt % to about 20 wt % was subsequently made and mixing was continued for between about 5 and about 10 minutes. The material was subsequently removed from the reactor and allowed to cool into a hard and tough thermoplastic material.

To make solution blended composite materials, acid treated cellulose was suspended in chloroform through use of a sonication bath. The resulting suspension was added to a solution of about 1 to about 99 wt %, possibly about 3 to about 30 wt %, and possibly about 5 to about 15 wt % solutions of NatureWorks polylactide in chloroform. The suspensions were stirred using a magnetic stir bar and associated laboratory stir plate for about 48 hrs before being precipitated into an about 10-fold excess of methanol. Alternatively, the polymer composite may be isolated by evaporating off the solvent After preparation, the material was ground in a Foremost 2A-4 grinder to a maximum particle size of about 5 mm, with pellets being generally about 2 mm to about 3 mm in diameter. Samples for further testing were prepared by a combination of vacuum- and compression-molding. The material was first melted under vacuum (about 25 inch Hg) at about 190° C. until the amount of gas released decreased significantly. Afterwards the material was compression molded at about 180° C. for about 5 minutes under a load of about 5000 psi and ten quenched between water-cooled plates.

Samples were analyzed for heat distortions temperatures by Dynamic Mechanical Thermal Analysis (DTMA) using an ARES rheometer (TA Instruments, Piscataway N.J.) with torsional rectangular fixtures according to the method of Takemori (Takemori, M. T., *Towards an understanding of the heat deflection temperature of thermoplastics*, Polymer Science and Engineering 19(15), pp. 1104-1109, 1979). Before testing, the ARES rheometer was calibrated for normal force and torque. Samples were subjected to about 0.1% strain at about 1 Hz while being heated from about 30 to about 160° C. at about 5° C./min under tension. The heat distortion temperature (HDT) of polymers is typically determined using a three-point bending test as described by ASTM method D 648-07. This test subjects a polymer bar of dimensions about 127 mm×about 13 mm×about 3 mm to an edgewise load of about 1.82 MPa. The heat distortion temperature is defined as the temperature at which the sample bar deflects about 0.25 mm. Takemori's method uses the temperature at which the value of the dynamic Young's modulus equals about 0.75 GPa during heating.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for preparing a composite, comprising the steps of:
   a. Preparing an acidic aqueous suspension of cellulose using an acid mixture of hydrochloric acid and an organic acid in the presence of intensive mixing such that hydrolysis of the cellulose leads to the formation of cellulose nanoparticles with one dimension in the size range from 1 to 100 nanometers and the organic acid reacts with the cellulose to produce surface-functionalized cellulose particles and then washing and drying the functionalized cellulose particles to produce cellulosic nanowhiskers;
   b. Adding to the cellulosic nanowhiskers produced from the surface-functionalized cellulose particles, (i) one or more of molten lactide, lactide solution, lactic acid, and lactic acid solution and optionally (ii) one or more of molten polylactide and polyactide solution to produce a mixture; and
   c. Subjecting the mixture to intensive mixing in one or more of a high intensity mixer and sonication bath such that the cellulosic nanowhiskers produced from the surface-functionalized cellulose particles are finely dispersed throughout the mixture to form a suspension; and
   d. Polymerizing the suspension of the mixture with the cellulosic nanowhiskers produced from the functionalized cellulose particles so as to covalently attach the cellulosic nanowhiskers with the mixture.

2. The method according to claim 1, wherein the organic acid is selected from the group consisting of acetic acid, lactic acid, formic acid, propanoic acid, butanoic acid, pentanoic acid, hexanoic acid, heptanoic acid, octanoic acid, nonanoic acid, decanoic acid, dodecanoic acid, octadecanoic acid, and benzoic acid.

3. The method according to claim 1, wherein the substance to be added to the resulting surface functionalized cellulose particles is selected from the group consisting of molten lactide and lactide solution and the resulting mixture is heated and polymerized in the presence of a catalyst.

4. The method according to claim 3, wherein the catalyst is stannous octoate.

5. The method according to claim 1, wherein the substance to be added to the resulting surface functionalized cellulose particles is polylactide solution, and the polymer composite is separated from the solvent.

6. The method according to claim 5, wherein the method of separating the polymer composite from the solvent is selected from the group consisting of precipitation, distillation, evaporation, or devolatilization.

7. The method according to claim 1, in which the mixture of acid-treated cellulosic nanowhiskers is fractionated by size using techniques selected from the group consisting of centrifugation, membrane separation, filtration, or chromatography.

8. The method according to claim 1, comprising the additional step of adding functionalized polymers of cellulose including, but not limited to, cellulose acetate, cellulose butyrate, cellulose propionate, methyl cellulose, and ethyl cellulose to the mixture.

9. The method according to claim 3, in which the resulting surface-functionalized cellulose particles are added to one or more of molten lactide or lactide solution, polymerized, and the resulting composite is contacted with poly(acrylic acid) or other stabilizer to form a stabilized composite.

10. The method according to claim 1, comprising the additional step of adding impact modifying agents selected from the group consisting of ethylene copolymers, degradable copolymers, and acrylic copolymers to the mixture.

11. The method according to claim 8 wherein the resulting cellulose is dispersed throughout a matrix simultaneously.

12. A method for producing a composite according to claim 1 in which the composite is produced continuously through the use of a continuously stirred tank reactor staged to feed into an extruder in which the impact modifier, stabilizer, or other additives including but not limited to pigments are added, and the composite is extruded.

13. A method according to claim 12 in which devolatilization during extrusion is accomplished through application of a vacuum applied to an open port on the extruder.

14. A method according to claim 12 in which the extruder feeds the composite material to a device selected from the group consisting of a pelletizing die, a sheet die so as to produce a continuous sheet of desired width and thickness, and a profile shaping die.

15. A composite produced by the method according to claim 1, wherein the composite takes a form selected from the group consisting of a molded article or a blown article.

16. A composite according to claim 15, wherein the shape of the molded article is selected from the group consisting of a dining utensil, a plate, a tray, a cup, a molded toy, and a shotgun shell cup.

* * * * *